June 25, 1968 — E. S. BARLEY — 3,389,803

ORALLY OPERABLE WATER FILTER

Filed Oct. 9, 1967

INVENTOR.
EDWARD S. BARLEY
BY
Wm. H. Dean

United States Patent Office 3,389,803
Patented June 25, 1968

3,389,803
ORALLY OPERABLE WATER FILTER
Edward S. Barley, 3014 N. 15th Ave.,
Phoenix, Ariz. 85014
Filed Oct. 9, 1967, Ser. No. 673,760
5 Claims. (Cl. 210—266)

ABSTRACT OF THE DISCLOSURE

An orally operable water filter comprising a housing having a mouthpiece on one end and a retaining cap on the other end all enclosing a pair of filter plates spaced from each other between which activated carbon is disposed, and also comprising a bacteria filter in an end opposite the mouthpiece end; said bacteria filter being protected by a pair of screens disposed on opposite sides thereof.

---

This invention relates to an orally operable water filter, and more particularly, to an orally operable water filter which may be used by an individual to withdraw and automatically filter water from various sources simply by applying vacuum to the filter by means of a person's mouth.

Background of the invention

Various filters have been used for filtering water, however, there has been a need for a simple and economical orally operated water filter which may be carried by outdoorsmen, military men, and others for obtaining potable water from various sources which may be poluted or may include or carry harmful bacteria or other materials which render water unpotable.

Summary of the invention

The present invention comprises a very simple and economical hollow tubular filter housing having a mouthpiece on one end adapted to be engaged by a person's lips for applying a partial vacuum to the interior of the filter housing, wherein a pair of spaced filter plates retain activated carbon in the housing, and the invention also comprises a bacteria filter in the opposite end of the housing from the mouthpiece, and this bacteria filter is secured by a sealed cap on the housing, and also protected by a pair of screens in contiguous relation with opposite sides of the bacteria filter.

Accordingly, it is an object of the present invention to provide a very simple and economical orally operable water filter which may be used by outdoorsmen to obtain potable water from various sources which may be polluted or contain harmful bacteria.

Another object of the invention is to provide a very simple orally operable water filter which may comprise a hollow tubular housing having an integral mouthpiece on one end and a frictionally engaged cap on the opposite end, all of which retains a pair of spaced filter plates with activated carbon therebetween, and also a bacteria filter protected by a pair of opposed screens on opposite sides thereof.

Another object of the invention is to provide a very simple orally operated water filter having novel features of construction which retain and seal a variety of filter elements in the hollow housing of the invention on one end of which a hollow mouthpiece is disposed and the opposite end of which contains an inlet provided with a bacteria filter disposed to operate in series with filter plates retaining a large body of activated carbon in the housing.

Further objects and advantages of the present invention may be apparent from the following specification, appended claims, and accompanying drawings:

Description of the preferred embodiments

Figure 1:
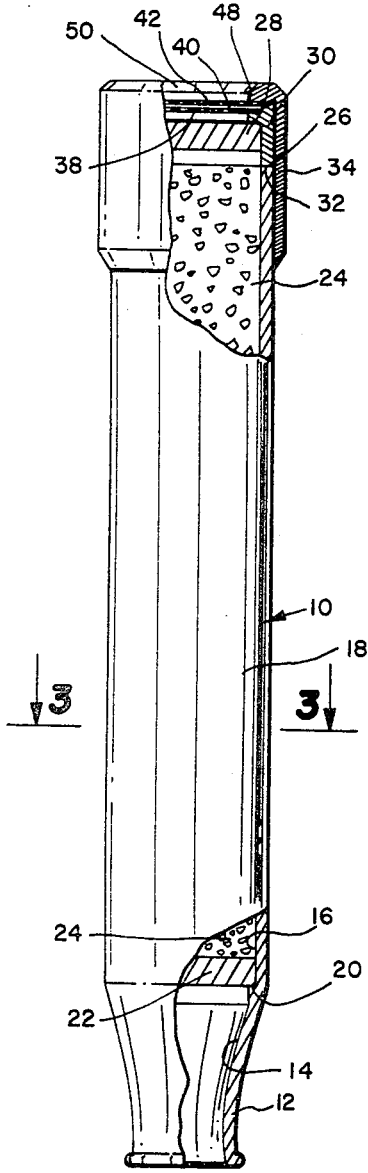
FIG. 1 is a side elevational view of an orally operable water filter showing portions of the invention broken away and in section to amplify the illustration.
Figure 3:
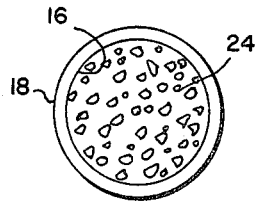
FIG. 3 is a sectional view taken from the line 3—3 of FIG. 1.

As shown in FIG. 1 of the drawings, the invention comprises a hollow tubular housing 10 having an integral mouthpiece 12 on one end. This mouthpiece 12 is generally circular in cross-section and slightly reduced in diameter from that of the body of the housing 10. The mouthpiece 12 is provided with an internal bore 14 which communicates with a bore 16 in a body portion 18 of the housing 10. This body portion 18 being generally circular in cross-section, as shown in FIG. 3 of the drawings, and an elongated configuration.

At a transition between the bore 14 of the mouthpiece 12 and the bore 16 of the body 18 is an abutment shoulder 20 against which a filter plate 22 is abutted. This plate 22 may be of any suitable pervious material of rigid or semi-rigid character, and is preferably substantially capable of excluding the passage of material larger than 120 microns.

Adjacent to the filter plate 22 is activated carbon 24 retained in the bore 16 of the body 10. This activated carbon 24 is retained near an opposite end 26 of the housing 10 by means of a second filter plate 28 similar to the filter plate 22. This filter plate also being capable of preventing the passage of material larger than 120 microns. Thus, the activated carbon 24 is retained between the first and second filter plates 22 and 28, respectively, all as will be hereinafter described in detail.

The second filter plate 28 is surrounded by a retainer ring 30 having an end 32 abutted to the end 26 of the body 18. Surrounding the retainer 30 and the body 18 is a cap 34.

The body 18 of the housing 10 and the cap 34, as well as the retainer 30, may be of resilient yieldable plastic material, such that the cap 34 is pressed onto the periphery of the retainer 30 and the body 18 to form a water tight seal.

Figure 2:
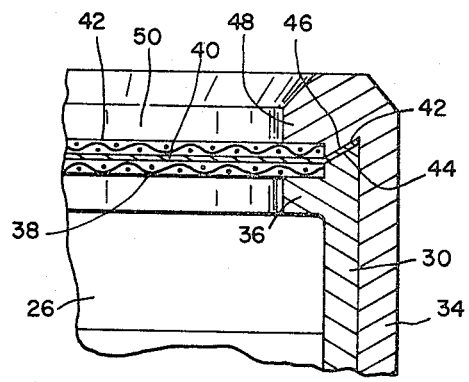
FIG. 2 is an enlarged fragmentary sectional view taken on the same plane as FIG. 1, and showing the inlet end of the filter of the invention.

The retainer member 30 is provided with an inwardly directed ledge or shoulder 36, shown best in FIG. 2 of the drawings. This shoulder 36 supports and abuts a first screen 38 which supports one side of a filtering element 40, the opposite side of which is supported by a similar screen 42. These screens 38 and 42 being approximately 80 mesh. The filtering element 40 has a peripheral portion 42 clamped between abutment surfaces 44 and 46 of the retainer 30 and the cap 34, respectively. This portion 46 of the filter element 40 extends peripherally beyond the periphery of the screens 38 and 42, all as shown best in FIG. 2 of the drawings.

The cap 34 is provided with a ledge structure 48 opposing the ledge or shoulder 36 of the retainer 30, this structure 48 abuts the outermost screen 42.

The filtering element 40 is a bacteria filter and adapted to prevent the passage of bacteria therethrough. This filtering element may be made of a micro fiber into the form of a fiberous glass disc with an acrylic liner or may be made of nylon or cellulose acetate, Teflon or polyvinyl chloride, or asbestos fiber, or any other equivalent materials specifically designed for potable water filtration, and for the purpose of preventing the passage of bacteria from the outer side of the housing and thereinto toward the mouthpiece 12.

The cap 34 inwardly relative to the shoulder structure 48 is open to provide an open end 50 of the water filter of the invention to receive water to be filtered which may force through the filter of the invention by the application of a partial vacuum in the housing 10 induced by suction of a person's mouth with the person's lips surrounding the mouthpiece 12.

During oral operation of the invention, water passes through the inlet 50 and the screens 38 and 42 support the filtering element 40 while it prevents the passage of bacteria into the housing 10. The water then passes through the filter 26 and through the activated carbon 24, through the filter plate 22, and then through the mouthpiece 12 and into a person's mouth which thus receives potable water after filtration from the source of water into which the open end 50 may be immersed.

It will be appreciated by those skilled in the art that a hunter or other outdoorsmen may be capable of immersing the open end 50 into a pool of water containing bacteria or pollution, and that suction applied to the mouthpiece 12 will result in the delivery of potable water through the mouthpiece and to the person applying partial vacuum or suction on the mouthpiece.

Figure 4:
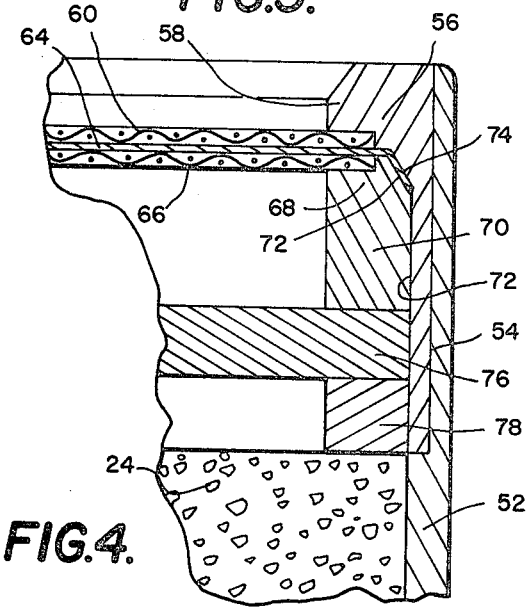
FIG. 4 is a view similar to FIG. 2, but showing a modified structure of the invention.

In a modification of the invention, as shown in FIG. 4 of the drawings, a housing 52 is similar to the housing 10 and a mouthpiece is connected or integral with the housing 52 similar to that as shown in FIG. 1 of the drawings.

The housing 52 is provided with an internal bore 54 which is enlarged and receives a retainer sealingly and frictionally, this retainer being designated 56, and the retainer 56 is similar to the cap 34, but fits internally of the bore 54, and constitutes a cap structure having inwardly ledge 58 holding a screen 60 similar to the screen 42. A filtering element 64 is similar to the element 40 is retained by the screen 60 adjacent to a second screen 66 similar to the screen 38, hereinbefore described, this screen being mounted on a shoulder 68 and abutted thereto, this shoulder being a part of a retainer ring 70 having an angular seat 72 supporting a peripheral portion 74 of the filter element 64. This peripheral portion 74 of the element 64 is also engaged by a complemental shoulder of the retainer or cap 56, and the peripheral portion of the shoulder element 64 is formed at an angle to the plane of the filter when the retainer 56 is forced into the bore 54. The retainer or cap 56 is provided with a bore 72 in which the ring 70 and a peripheral portion of a filter plate 76, as well as another retainer ring 78 is held. The periphery of the filter plate 76 is held between the rings 70 and 78 which are pressed into the bore 72 of the retainer tap 56.

The plate 76 is similar to the filter plate 28, hereinbefore described.

In operation, the modified structure, as disclosed in FIG. 4, performs similarly to that as hereinbefore described in connection with the disclosure of FIG 2.

It will be obvious to those skilled in the art that various modifications of the present invention may be resorted to in a manner limited only by a just interpretation of the following claims.

I claim:
1. In an orally operable water filter, the combination of: an elongated hollow tubular filter housing having a mouthpiece on one end, said mouthpiece adapted to be sealingly engaged by a human mouth to effect a partial vacuum in said housing; a first filter plate in said housing adjacent said mouthpiece; a second filter plate in said housing and disposed in spaced relation to said first filter plate in a direction longitudinally in said housing; activated carbon disposed in said housing between said first and second filter plates; a retainer means carried by said housing at an opposite end thereof from said mouthpiece; a bacteria filter element adapted to permit water to pass therethrough and adapted to prevent passage of bacteria into said housing, said filter element disposed at said opposite end of said housing, said bacteria filter element sealingly engaged with said housing by said retainer means; metal screen means on opposite sides of said bacteria filter element and held adjacent thereto by said retainer means; said retainer means comprising a shoulder forming an abutment for said screens and said filter elements; and a cap member frictionally and sealingly engaging said housing and holding said screens and said filter element in position in said housing.

2. The invention, as defined in claim 1, wherein: said mouthpiece being integral with said housing, said housing having a bore provided with a shoulder adjacent said mouthpiece, said first filter plate abutted to said last mentioned shoulder.

3. The invention, as defined in claim 2, wherein: said cap is fitted over the outside of said housing.

4. The invention, as defined in claim 1, wherein: said filter element at a peripheral portion thereof is clamped between a portion of said housing and said cap at said retainer means.

5. The invention, as defined in claim 1, wherein: said filter plates being approximately 120 micron filters; said screens being approximately 80 mesh and said filter element being capable of excluding the passage of bacteria therethrough.

References Cited

UNITED STATES PATENTS

| | | | |
|---|---|---|---|
| 1,000,332 | 8/1911 | Dyer | 210—314 X |
| 1,333,011 | 3/1920 | Crady | 210—266 X |

SAMIH N. ZAHARNA, *Primary Examiner.*